United States Patent [19]

Seibert

[11] 3,864,400

[45] Feb. 4, 1975

[54] PRODUCTION OF ARYL-(4,4'-BIS-(DIALKYLAMINO)-BENZ-HYDRYL)-SULFONES

[76] Inventor: Walter Seibert, 46 Leuschnerstrasse, 6700 Ludwigshafen, Germany

[22] Filed: Feb. 20, 1973

[21] Appl. No.: 333,644

[52] U.S. Cl............................................ 260/570 D
[51] Int. Cl............................................ C07c 85/00
[58] Field of Search................................ 260/570 D

[56] References Cited
UNITED STATES PATENTS
3,193,404   7/1965   Davis .......................... 260/570 UX Primary Examiner—Robert V. Hines
Attorney, Agent, or Firm—Johnson, Keil, Thompson & Shurtleff

[57] ABSTRACT

Production of aryl-4,4'-bis-(dialkylamino)-benzhydryl)-sulfones by condensation of a 4,4'-bis-(dialkylamino)-benzhydrylamine with an arylsulfinic acid or a salt thereof.

2 Claims, No Drawings

PRODUCTION OF ARYL-(4,4)-BIS-(DIALKYLAMINO)-BENZHYDRYL)-SULFONES

The invention relates to a process for the production of compounds of the formula (I):

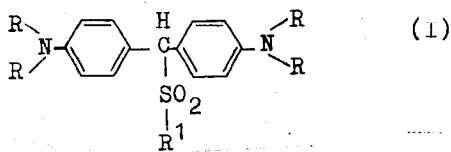

in which:
R is methyl or ethyl; and
$R^1$ is phenyl or naphthyl which may bear alkyl, chloro, nitro or alkoxy as a substituent;
wherein compounds of the formula (II):

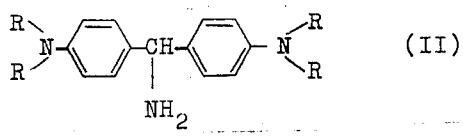

are condensed in acid solution with a compound of the formula (III):

Compounds of formula (II) include:
4,4'-bis-(dimethylamino)-benzhydrylamine ("Leuco auramine") and 4,4'-bis-(diethylamino)-benzhydrylamine ("Leuco ethyl auramine").

These compounds are accessible by reduction from the corresponding auramines, for example with zinc dust and acid. The production is known from the literature.

The compounds of formula (III) ($R^1-SO_2H$) correspond to the formula:

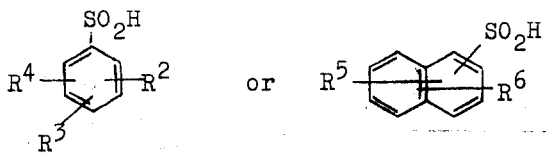

in which:
$R^2$ is hydrogen, alkyl, hydroxy, amino, methoxy, ethoxy, chloro or nitro;
$R^3$ is hydrogen, alkyl or chloro;
$R^4$ is hydrogen or methyl;
$R^5$ is hydrogen, hydroxy or amino; and
$R^6$ is hydrogen, hydroxy or amino.
Preferred substituents are hydrogen, methyl, chloro and nitro. $R^5$ and $R^6$ are preferably hydrogen.

Condensation of the compounds of formula (II) with those of formula (III) is carried out in acid solution at a pH of less than 6 and advantageously at a temperature of up to approx. 100°C. Examples of suitable acids are formic acid, acetic acid, hydrochloric acid, sulfuric acid and phosphoric acid or mixtures of the same.

The procedure for the production of compounds of the formula (I) may conveniently be that aqueous ammonia or dilute caustic soda solution is added in excess to an acid solution of leuco auramine which has been freed from excess zinc dust, so that the leuco auramine is deposited while zinc in complex form remains in solution. The separated leuco compound is then condensed in acid solution at a temperature of from 10° to 100°C, preferably in a range of temperature of from 30° to 60°C, with an arylsulfinic acid of the formula (III) or a salt thereof which is soluble under the reaction conditions. As a rule the condensation is over after a few minutes or at the most 1 hour to 2 hours heating.

Examples of salts of sulfinic acids are the alkali metal, alkaline earth metal, magnesium, ammonium and amine salts.

The procedure may also be that an arylsulfinic acid of formula (III) or a salt thereof is added to the acid solution of a leuco auramine of formula (II) (which has been obtained by reduction of the appropriate auramine in hydrochloric acid solution with zinc dust and water at a temperature of from about −10° to +30°C, preferably from 0° to +10°C) either immediately or after neutralization with sodium acetate.

It is possible, but not necessary, to add an organic solvent in the condensation.

The condensation products of formula (I) are for the most part precipitated during the reaction when the acid concentration is not too high. Separation can be completed by neutralizing the acid with alkali, alkali metal carbonates or acetates, a small excess not being injurious.

The crude condensation products of formula (I) may be purified in different ways, for example by dissolving them in excess dilute mineral acid and removing the constituents which are insoluble in acid, by boiling up with organic solvents in which the reaction products have only sparing solubility, for example methanol or ethanol, or by recrystallization from solvents such as aromatic hydrocarbons or halohydrocarbons.

The compounds of formula (I) are widely used as colorforming substances in pressure sensitive copying papers.

The present invention is easier to carry out industrially and is more economical than the conventional method using Michler's hydrol.

Details of the new process will be found in the following Examples in which parts and percentages are by weight. The melting points depend on the speed at which the compounds are heated up and are suitable only as rough guides.

EXAMPLE 1

Leuco Auramine 100 parts of Auramine 0 (C.I. 41,000, purity about 90%) is stirred with about 400 parts of water, then 400 parts of ice and 25 parts of zinc dust (about 90% purity) are added and 200 parts of 30% hydrochloric acid is allowed to flow in over 15 minutes at from −5° to +10°C. As soon as the solution has become colorless the undissolved zinc dust is filtered off and an excess of concentrated ammonia solution is added to the filtrate. Leucoauramine deposited as a precipitate is suction filtered and washed thoroughly with water.

100 parts of acetic acid, 100 parts of water and 50 parts of 30% hydrochloric acid are then added to the moist leucoauramine at room temperature. A dark blue solution is formed. The whole is heated to 50° to 60°C and 150 parts of sodium p-toluenesulfinate (about 40%) and 200 parts of water are added. The dark blue solution loses its color and the reaction product is deposited. After stirring at 60°C for 1 hour the whole is cooled to 35°C and 150 parts of 30% hydrochloric acid is added so that a solution is obtained which is freed from a small amount of impurities by filtration. The filtrate is then made weakly alkaline (pH about 8) with dilute caustic soda solution, and the deposited precipitate is suction filtered and washed with water until neutral. The filter cake is then boiled with 280 parts of ethanol, suction filtered while hot and washed with 300 to 400 parts of ethanol and dried at 80°C at subatmospheric pressure. 96 parts of colorless p-tolyl-(4,4'-bis-(dimethylamino)-benzhydryl)-sulfone is obtained which begins to melt at 171°C.

EXAMPLE 2

The moist leucoauramine prepared according to Example 1 is dissolved at 45°C in a mixture of 200 parts of water, 100 parts of acetic acid and 50 parts of 30% hydrochloric acid. Then 65 parts of sodium benzenesulfinate (about 85%) is introduced. A crystalline precipitate separates while the initial deep blue color of the solution disappears. To make the mixture capable of being stirred more easily another 200 parts of water is added. After stirring for another half an hour at 50°C the whole is cooled to room temperature and made weakly alkaline with 10% caustic soda solution. The crude reaction product is filtered off and washed with water. The moist filter cake is boiled up with 220 parts of methanol, filtered and washed with about 250 parts of methanol.

After drying at subatmospheric pressure at 80°C 101 parts of phenyl-(4,4'-bis-(dimethylamino)-benzhydryl)-sulfone is obtained which begins to melt at 117°C.

EXAMPLE 3

The moist leucoauramine prepared according to Example 1 is dissolved in 1000 parts of 10% sulfuric acid at room temperature. Then 150 parts of sodium p-toluenesulfinate (about 40%) is then gradually added at 30°C. After stirring for half an hour the whole is made weakly alkaline with 10% caustic soda solution. The precipitated crude reaction product is suction filtered and washed with water. The moist filter cake is boiled up with 350 parts of ethanol, filtered and washed with about 300 parts of ethanol.

After drying at subatmospheric pressure at 80°C 86 parts of p-tolyl-(4,4'-bis-(dimethylamino)-benzhydryl)-sulfone is obtained.

EXAMPLE 4

The moist leucoauramine prepared as in Example 1 is dissolved in 400 parts of water and 120 parts of formic acid (99%) at 50°C. Then 150 parts of sodium p-toluenesulfinate (about 40%) is added and the whole is stirred for one hour at 50°C, some of the reaction product separating in the form of powder. After cooling the precipitate is brought into solution by adding 1100 parts of water and 140 parts of 30% hydrochloric acid. A small amount of undissolved matter is suction filtered and the reaction product is precipitated in the filtrate by adding 10% caustic soda solution. The product which has been filtered off and washed is boiled up with about 250 parts of ethanol. After drying at subatmospheric pressure at 80°C 92 parts of p-tolyl-(4,4'-bis-(dimethylamino)-benzhydryl)-sulfone is obtained.

EXAMPLE 5

Moist 4,4'-bis-(diethylamino)-benzhydrylamine (leucoethylauramine) prepared from 120 parts of ethylauramine analogously to Example 1 is dissolved in 200 parts of water, 200 parts of acetic acid and 50 parts of 30% hydrochloric acid at 50°C. Then 65 parts of sodium benzenesulfinate (about 85%) is added and the whole is stirred for another 2 hours. After cooling the reaction product is deposited by adding 10% caustic soda solution up to the neutral point. It is suction filtered, washed with water and the moist filter cake is crystallized from ethanol in which the reaction product dissolves very well.

77 parts of phenyl-(4,4'-bis-(diethylamino)-benzhydryl)-sulfone is obtained. An analytically pure product having a melting point of 128.5° to 129°C is obtained by repeated recrystallization from ethanol.

EXAMPLE 6

The moist leucoauramine prepared according to Example 1 has 200 parts of acetic acid and 60 parts of a 30% hydrochloric acid added to it. The dark blue solution heated at 60°C has added to it 110 parts of calcium p-chlorotoluenesulfinate (about 60%). The mixture which has become colorless is stirred for another 2 hours at 60°C. Then it is diluted with 1000 parts of water, insoluble matter is filtered off and the residue is washed with about 1000 parts of water.

The filtrate is made just alkaline with 10% caustic soda solution while cooling. The crude reaction product precipitated is suction filtered and washed with water. The moist filter cake is boiled up with about 250 parts of ethanol, cooled to room temperature, suction filtered and washed with ethanol.

After drying at 80°C at subatmospheric pressure 113 parts of 4-chlorophenyl-(4,4'-bis-(dimethylamino)-benzhydryl)-sulfone is obtained having a melting point of 181° to 181.5°C. The product is still not quite devoid of inorganic constituents. An analytically pure product having a melting point of from 181° to 181.5°C is obtained by recrystallization from benzene. Analysis:

|  | C | H | N | S |
|---|---|---|---|---|
| Found: | 64.4% | 6.1% | 6.7% | 7.4% |
| Theoretical: | 64.39% | 5.87% | 6.53% | 7.47% |

EXAMPLE 7

The moist leucoauramine prepared according to Example 1 is dissolved at 40°c in 100 parts of acetic acid and 100 parts of a 30% hydrochloric acid. 70 parts of sodium 2-chlorotoluene-4-sulfinate (about 89%) is added and the whole is stirred for another 15 minutes. After cooling and dilution with water the reaction product is precipitated by adding 10% caustic soda solution up to the neutral point. The reaction product is suction filtered, washed with water and boiled with 240 parts of ethanol.

After drying at 80°C at subatmospheric pressure 90 parts of 3-chloro-4-methylphenyl-(4,4'-bis-(dimethylamino)-benzhydryl)-sulfone having a melting point of 166.5° to 167°C is obtained. An analytically pure product having a melting point of 166.5° to 167°C is obtained by recrystallization from benzene. Analysis:

| | C | H | S | Cl |
|---|---|---|---|---|
| Found: | 65.2% | 6.0% | 7.3% | 8.1% |
| Theoretical: | 65.07% | 6.14% | 7.24% | 8.00% |

EXAMPLE 8

The moist leucoauramine prepared according to Example 1 is dissolved in 300 parts of water and 300 parts of a 30% hydrochloric acid. A suspension of 125 parts of 2-nitrotoluene-4-sulfinic acid sodium salt (about 67%) and 250 parts of anhydrous sodium acetate in 400 parts of water is then added and the whole is stirred for 3 hours. After heating to 40°C the excess of acid is neutralized with 105 parts of calcined soda. The product is suction filtered, washed with water and dried at 80°C at subatmospheric pressure. 132 parts of impure 3-nitro-4-methylphenyl-(4,4'-bis-(dimethylamino)-benzhydryl)-sulfone of the melting point 174.5° to 175°C is obtained. By recrystallization from benzene there are obtained pale yellow crystals of the pure product having the melting point 188.5° to 189°C. Analysis:

| | C | H | N | S |
|---|---|---|---|---|
| Found: | 63.4% | 6.0% | 9.7% | 7.0% |
| Theoretical: | 63.55% | 6.00% | 9.26% | 7.07% |

I claim:

1. A process for the production of a 4,4'-bis-(dialkylamino)-benzhydrylsulfone of the formula (I):

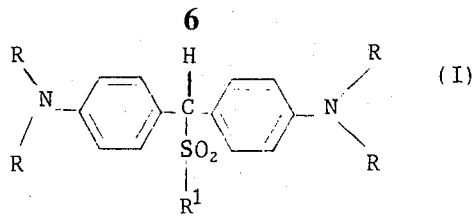

in which:
R is methyl or ethyl; and
$R^1$ phenyl or phenyl substituted by methyl, chloro or nitro wherein a compound of the formula (II):

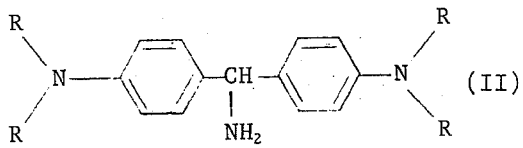

is condensed in acid solution at a pH of less than 6 with a compound of the formula (III):

$$R^1—SO_2H$$

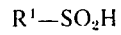

2. A process as claimed in claim 1 wherein a water-soluble salt of the acid (III) is used instead of the free acid.

* * * * *

UNITED STATES PATENT AND TRADEMARK OFFICE
CERTIFICATE OF CORRECTION

PATENT NO. : 3,864,400
DATED : February 4, 1975
INVENTOR(S) : Walter Seibert

It is certified that error appears in the above-identified patent and that said Letters Patent are hereby corrected as shown below:

In the heading, insert--[73] Assignee: Badische Anilin- & Soda-Fabrik Aktiengesellschaft, Ludwigshafen/Rhein, Germany--;

In the heading, insert--[30] Foreign Application Priority Data, February 24, 1972, Germany, P 22 08 611.9--;

Column 2, line 42, delete "colorforming" and insert--color-forming--.

Signed and Sealed this twenty-first Day of October 1975

[SEAL]

Attest:

RUTH C. MASON
Attesting Officer

C. MARSHALL DANN
Commissioner of Patents and Trademarks